United States Patent

Asai et al.

[11] Patent Number: 5,841,935
[45] Date of Patent: Nov. 24, 1998

[54] CODING METHOD AND RECORDING AND REPRODUCING APPARATUS

[75] Inventors: Toshiya Asai; Takato Narita, both of Kanagawa, Japan

[73] Assignee: Sony Corporation, Tokyo, Japan

[21] Appl. No.: 720,971

[22] Filed: Oct. 16, 1996

[30] Foreign Application Priority Data

Oct. 20, 1995 [JP] Japan .................................. 7-297493

[51] Int. Cl.⁶ .............................. H04N 5/92; H04N 5/76
[52] U.S. Cl. .............................. 386/33; 386/95; 386/111
[58] Field of Search .................................. 386/1, 33, 95, 386/111, 112; 348/391, 423; 360/13; H04N 5/76, 5/92, 9/79, 11/02, 11/04, 7/12

[56] References Cited

U.S. PATENT DOCUMENTS

| | | | |
|---|---|---|---|
| 4,319,289 | 3/1982 | Ravizza | 360/107 |
| 4,920,425 | 4/1990 | Sekimoto et al. | 358/906 |
| 5,172,239 | 12/1992 | Nakayama et al. | 360/77.12 |
| 5,469,270 | 11/1995 | Yamamoto | 360/13 |
| 5,506,689 | 4/1996 | LIm | 360/49 |
| 5,594,550 | 1/1997 | Juri et al. | 386/40 |

*Primary Examiner*—Thai Tran
*Attorney, Agent, or Firm*—Frommer Lawrence & Haug, LLP; William S. Frommer

[57] ABSTRACT

In a coding method and a recording and reproducing apparatus, a moving image and a compressed moving image can be coded and decoded by means of the GOP sequence without using the GOP sequence information. The image frames are arranged in the same frame order in each of the plurality of GOP's. And at the same time, each of the GOP's are set so that the GOP is processed in the same GOP sequence. Then, correspondence information is set that allows the color frame sequence information to correspond to the GOP sequence on a one to one basis. The GOP sequence that corresponds to the color frame sequence information extracted from the moving image and the compressed animated image data is selected by using the set information to perform the coding process and the decoding process by means of the selected GOP sequence.

9 Claims, 4 Drawing Sheets

| CF | F | H |
|---|---|---|
| 0000 | A1-1 | B-PICTURE |
| 0001 | A1-2 | |
| 0010 | A2-1 | I-PICTURE |
| 0011 | A2-2 | |

CODING METHOD AND RECORDING AND REPRODUCING APPARATUS

BACKGROUND OF THE INVENTION

1. Field of the Invention

The present invention relates to a coding method and a recording and reproducing apparatus, and is for example, preferable for compressing and coding, recording, decoding, and reproducing a moving image signal.

2. Description of the Related Art

Conventionally, in the case where a moving image signal is transmitted to a remote place in a video conference system or a video telephone system or the like, the image signal is compressed and coded by using line correlation and frame correlation for effective use of the transmission path. The similar method is applied to a video recording and reproducing system using a recording media, such as a hard disk, and an MO disk for increasing a recording time per unit capacity. For example, when frame correlation is used, the amount of information can be compressed by performing orthogonal conversion such as discrete cosine transform (DCT) to an image signal with respect to a macro block which is divided from a frame screen and quantizing it.

In the compression coding of a moving image signal using such correlation between frames, one compression sequence can be completed in an image frame unit which is referred to as a GOP (Group of Pictures).

For example, when a GOP comprises two frame units, one sequence is completed by compressing and coding the images in the two frames in the form of an I-picture and a B-picture. When a GOP comprises four frame units, one compression sequence is completed by compressing and coding the images in the four frames into an I-picture, a B-picture and a P-picture.

The I-picture represents an image frame coded as it is by using, for example, the DCT (Discrete Cosine Transform) coding. The B-picture represents an image frame which is decoded by prediction between frames using a frame present in the forward and backward bidirections. The P-picture represents an image frame which is decoded by prediction between frames using a frame which is present in one direction.

Generally, the images in frames adjacent in time do not show a large change. Therefore, the I-picture is used as a reference frame image, and the B- and P-pictures are formed by extracting the differences from the I-picture. At the time of decoding, parts other than the differences are interpolated by prediction using both the forward and backward direction by using the I-picture as a reference image. In this manner, a video signal can be efficiently compressed and coded. Incidentally, since the B-picture and the P-picture can be decoded by prediction using the I-picture, one I-picture must be present without fail in one GOP.

Furthermore, since the B-picture is decoded by prediction based on a both forward and backward direction frame and the P-picture is decoded by prediction based on a one direction frame respectively, the I-picture must be restored first into each image frame in the compressed and coded GOP.

Here, in the compressed moving image data, the frame order is replaced because the image data is restored in the order of transmission and recording.

For example, as shown in FIG. 1, in one GOP unit which formed of four subsequent image frames, with respect to each of the image frames, which are input in the order of frame A1, frame A2, frame A3 and frame A4, the frame order of each image frame is replaced in accordance with the coding form which is used in the compression coding. Here, frames A1 and A3 represent image frames which are coded in the B-picture, frame A2 represents an image frame coded in the I-picture. Frame A4 represents an image frame coded in the P-picture.

The image frames, which are input in the order of frame A1, frame A2 and frame A3, and frame A4 are rearranged into the order of frame A2, frame A1, frame A4 and frame A3 at the time of the coding process. Each image frame which is coded and transmitted or recorded is rearranged back into the original order at the time of decoding.

In other words, since the image frames, which have been rearranged into the order of frame A2, frame A1, frame A4 and frame A3, are decoded in the order of transmission and recording, frame A2 (which comprises the I-picture) is decoded first followed by the decoding of frame A1 (comprising the B-picture) on the basis of the decoding of frame A2. Then frame A4 (which comprises the P-picture) is decoded on the basis of frame A2, and lastly, frame A3 is decoded on the basis of frame A1 and frame A4. Each of the image frames decoded in this manner are replaced back into the original image frame order at the time of decoding and are displayed on a monitor or the like.

In this manner, each image frame is replaced immediately after or soon after the image frame which constitutes the reference for prediction at the time of coding so that each image frame is transmitted and recorded with the result that the image frame which constitutes an object can be decoded immediately after the image frame which constitutes the reference is decoded at the time of decoding. Consequently, the time required for the decoding process can be shortened, thereby avoiding a delay in the image display.

In the compression coding of a moving image signal using correlation between frames, each image frame is compressed and coded for each GOP unit by a technique such that the editing of image frames for one GOP unit and the random access for one GOP unit are enabled from the compression moving image data.

By the way, in the compressed video data which has coded for every GOP units, such as GOP sequence information showing that each frame before coded is coded in which of I-, B-, or P-picture, and which corresponds to what number of frame in GOP, is added.

These information are referred at the time of decoding, but they are not needed after decoding in general.

On dubbing, however, in the case where a moving image signal passed through compression coding/decoding process is compressed and coded again by using a similar compression algorithm, in view of frames of a moving image, differences are appeared in image quality after dubbing in accordance with that whether the relative position of a frame in one GOP sequence is the same or not at the first and the second compressing and coding. As to image quality after dubbing, the deterioration of image-quality can be suppressed extremely when the first and the second correspondence relations of a moving image being an original image and the GOP sequence are coincided with each other.

Therefore, it is good to add the moving image signal passed through compression coding and decoding, the GOP sequence information which has used at this time and transmit it, and when it is compressed again by a dubbing device, it is good to compress the moving image with referring to the transmitted GOP sequence information so as to correspond to the GOP sequence at the last time.

The transmitting format of an image signal, however, is so constituted that GOP sequence information cannot be transmitted in general, thus there is a problem that GOP sequence information cannot be transmitted for improving image quality on dubbing.

SUMMARY OF THE INVENTION

In view of the foregoing, an object of the present invention is to provide a coding method and a recording and reproducing apparatus wherein the GOP sequence can be stored without including the GOP sequence information in a compressed and decoded image signal.

The foregoing objects and other objects of the invention have been achieved by the provision of a recording and reproducing apparatus for compressing and coding an input video signal to record on a predetermined recording medium, and for reproducing the compressed and coded video signal from the recording medium to decode it, the apparatus comprises extracting means for extracting color frame information from video frames of the input video signal and the compressed video signal outputted from the recording medium, control means for storing correspondence information which shows the correspondence relation between compression information, which is needed when the video signal is compressed and coded, and the color frame information, to control the coding of the video image based on the correspondence information according to the compression information which is corresponding to the extracted color frame information, and adding means for adding the color frame information extracted by the extracting means to the compressed and coded video signal and the decoded video signal.

Further, in the present invention, a recording and reproducing apparatus for recording an input video signal onto a predetermined recording medium and for reproducing the video signal from the recording medium, the apparatus comprises extracting means for extracting color frame information from the input video signal, coding means for performing compression coding to the video signal by using a frame correlation, coding control means for storing correspondence information which shows the correspondence relation between the color frame information extracted by the extracting means and compression information, which is needed in compression coding by the coding means, to control the coding of the coding means based on the correspondence information according to the compression information which is corresponding to the color frame information outputted from the extracting means, adding means for adding the color frame information extracted by the extracting means to the video signal compressed and coded by the coding means, recording means for recording the video signal supplied from the adding means onto the predetermined recording medium, and reproducing means for extracting the color frame information from the video signal recorded on the recording medium and decoding the video signal, and for adding the color frame information to the decoded video signal to output it.

In the present invention, a coding method of compressing and coding a video signal by using a frame correlation comprises a first step of placing the fixed number of image frames in the same order of frames in each GOP, which is plurally formed per the fixed image frames when the video signal is coded, a second step of setting so that each GOP is processed in the same GOP sequence, a third step of setting correspondence information in which color frame information added to the video signal and plural GOP sequences are made to correspond on a one to one basis, and a fourth step of making the GOP sequence correspond to the color frame information based on the correspondence information to code the video signal.

The nature, principle and utility of the invention will become more apparent from the following detailed description when read in conjunction with the accompanying in which like parts are designated by like reference numerals or characters.

DETAILED DESCRIPTION OF THE EMBODIMENT

Figure 1:
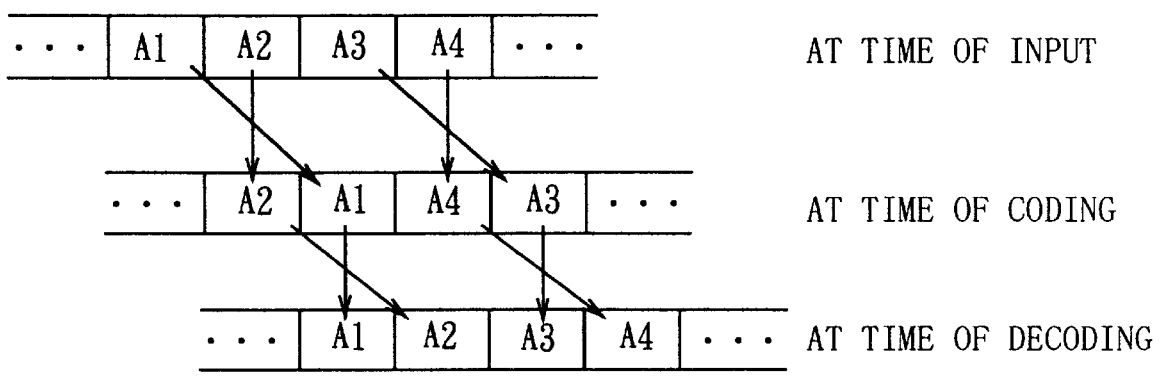
FIG. 1 is a flowchart for explaining frame exchange in coding using correlation between frames in case of being GOP=4-frame.
Figure 2:
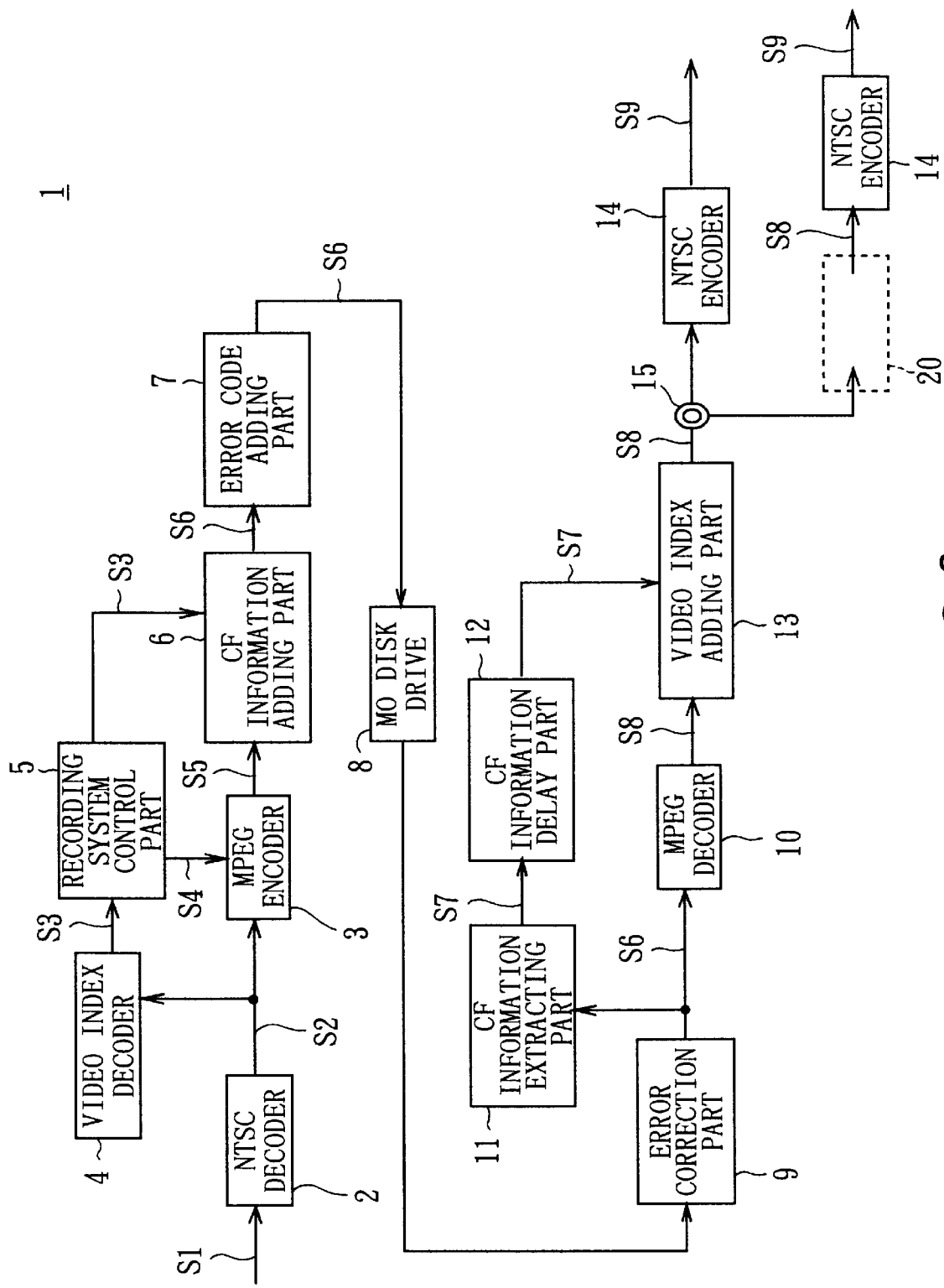
FIG. 2 is a block diagram showing a structure of a recording and playing back apparatus according to an embodiment.

Preferred embodiment of the present invention will be described with reference to the accompanying drawings:

In FIG. 2, reference numeral 1 denotes a recording and playing back apparatus as a whole which is constituted so that a NTSC composite signal to be input is compressed, coded, and recorded and is then output after being played back and decoded.

The recording and playing back apparatus 1 supplies the input NTSC composite signal S1 to an NTSC decoder 2. The NTSC decoder 2 decodes the NTSC composite signal S1 into a component SDI signal S2 to supply the signal to an MPEG encoder 3 and a video index decoder 4. The video index decoder 4 extracts a color frame (CF) information signal S3 from the video index signal which is added to the head of each field data of the supplied component SDI signal S2 and supplies it to the recording system control part 5. In this connection, the SDI format is a standard of an audio signal and a video signal in digital format which is standardized by the SMPTE (Society of Motion Picture and Television Engineers) −259M.

Here, the CF information signal S3 is a signal that indicates the CF information which is conventionally included in the NTSC composite signal S1. In addition, when the NTSC composite signal S1 is converted to the component SDI signal S2, the signal is coded and included in the video index signal positioned at the head of each field. When the CF information signal S3 is expressed, for example, in four bits, the signal changes in a successive manner such as from "0000" to "0001", and "0010" in successive field A1-1 (the first field of frame A1), field A1-2 (the second field of frame A1), and field A2-1 (the first field of frame A2) or the like. At the same time, the signal comprises a bit pattern wherein the pattern is repeated in a definite cycle.

Figures 3, 4:
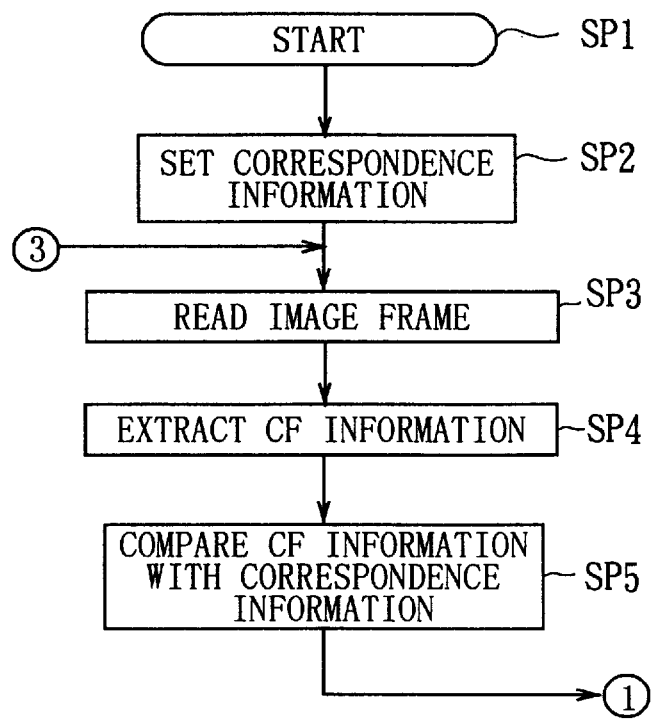
FIG. 3 is a table showing an example of correspondence between CF information and GOP sequence.
FIG. 4 is a flowchart showing a procedure for a compression coding and decoding process using CF information.

A table shown in FIG. 3 shows the corresponding information of a bit pattern of the CF information and the corresponding GOP sequence process. The recording and playing back apparatus 1 allows respective bit patterns represented in the CF information to correspond to the coding method by the GOP sequence and the frame order. Here, CF represents a bit pattern denoted by the CF information. Symbol F denotes how many frames there are before the coding of the frames in the GOP and the frame is in which field. In addition, symbol H denotes the form in which the image frames will be coded or are coded. The correspondence shown here is given for the case where the number of image frames in the GOP is four.

For example, in the case where the bit pattern is "0000" or "0001", it is shown that the position of the image frame in the GOP before the coding is the first frame A1 and, at the same time, the image frame is a frame which will be coded or is coded in the B-picture. In addition, in the case where the bit pattern is "0010" or "0012", it is shown that the position of the image frame in the GOP before the coding is the second frame A2.

The recording system control part 5 is preliminarily set by memorizing such correspondence information (FIG. 3) in a memory (not shown) provided inside thereof so that the GOP sequence process according to the bit pattern shown in the CF information signal S3 supplied from the video index decoder 4 is selected by referring to the correspondence information (FIG. 3). The recording system control part 5 sends a control signal S4 corresponding to the selected process to the MPEG encoder 3. Furthermore, the control part 5 sends the supplied CF information signal S3 to the CF information adding part 6.

Figure 6:
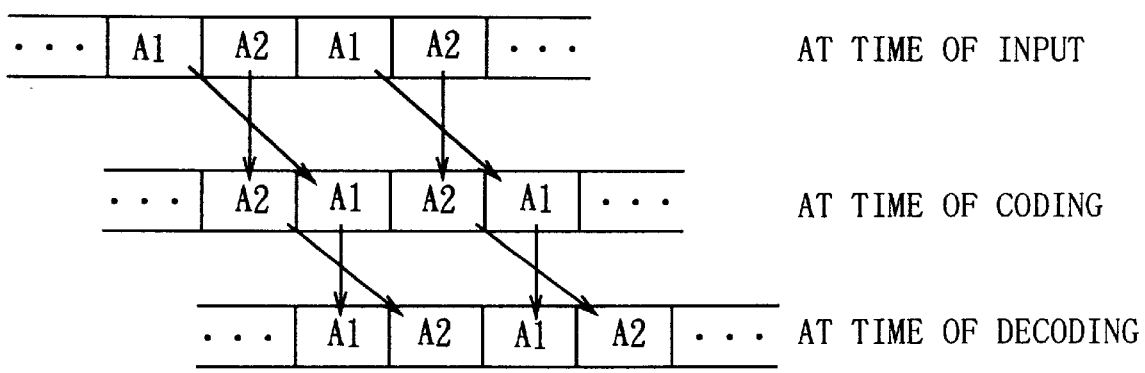
FIG. 6 is a flowchart for explaining frame exchange in coding using correlation between frames in case of being GOP=2-frame.

The MPEG encoder 3 subjects the supplied component SDI signal S2 to the GOP sequence processing instructed by the control signal S4. In other words, for example, in the case where the bit pattern shown in the CF information signal S3 is "0000" or "0001", the bit pattern is coded into the B-picture, and the frame is replaced as a second step in the GOP (FIG. 6). The MPEG encoder 3 subjects the component SDI signal S2 to the coding process and frame exchange process for each image frame, and at the same time, compressed data S5 is formed in the GOP unit to send the compressed data S5 to the CF information adding part 6.

The CF information signal S3 with a phase which has been compensated the time necessary for the compression process by the MPEG encoder 3 is supplied to the CF information adding part 6 from the recording system control part 5. The CF information adding part 6 forms compression data S6 by adding this CF information signal S3 to the compressed data S5 to send the compressed data to the error code adding part 7.

The error code adding part 7 adds an error code to the compressed data S6 to send the compressed data S6 to an MO (Magneto-Optical) disk drive 8. The MO disk drive 8 records the supplied compressed data S6 and at a request from the outside plays back the compressed data S6 to send the data to the error correction part 9.

The error correction part 9 corrects errors in the read data by using the error code added to the compressed data S6 if any such error is generated. In the case where an error is generated which cannot be corrected, an error flag bit is set in the data. After error treatment, the compressed data S6 is supplied to the MPEG decoder 10 and the CF information extracting part 11. The CF information extracting part 11 extracts the CF information signal S7 from the compressed data S6 to send the signal to a CF information delaying part 12. The CF information delaying part 12 delays the CF information signal S7 by the time necessary for the decoding by the MPEG decoder 10 to output the CF information signal S7 having the phase in which the time necessary for the decoding process is compensated.

The MPEG decoder 10 decodes the compressed data S6 based on a parameter included in the compressed data S6 to form a component SDI signal S8. The restored component SDI signal S8 is sent to the video index adding part 13 to add the CF information signal S7, which is sent from the CF information delaying part 12. This CF information signal S7 provides a phase to compensate for the period of the restoration process by the MPEG decoder 10 with respect to the CF information signal S3.

The component SDI signal S8 to which the CF information signal S7 is added is converted into a NTSC composite signal S9 by the NTSC encoder 14 to be output thereafter.

In this manner, the recording and reproducing apparatus 1 subjects a moving image signal which comprises an input NTSC composite signal S1 to a coding process according to the GOP sequence on the basis of the extracted CF information signal S3 and records it. The sequence information is outputted to the reproduced image data in the form of CF information in the video index.

Further, in the case where the reproduced moving image data is dubbed onto a recording and reproducing apparatus 20, which has the same structure as the aforementioned recording and reproducing apparatus 1, the component SDI signal S8 with an added CF information signal S7 from a terminal 13 provided between the video index adding part 15 and the NTSC encoder 14 is extracted to be supplied to the recording and playing back apparatus 20.

The recording and reproducing apparatus 20 can perform compression coding in a GOP phase same as one on compression at the last time by extracting the CF information signal S3 from the supplied component SDI signal S8 and referring to the CF information signal S3.

In the aforementioned structure, the recording and playing back apparatus 1 uses the CF information, which comprises a successively and regularly changing bit pattern and which is conventionally included in the video index signal, in place of the GOP sequence information to subject the input animated signal and the compressed moving image data to the compression coding and decoding process.

Figure 5:
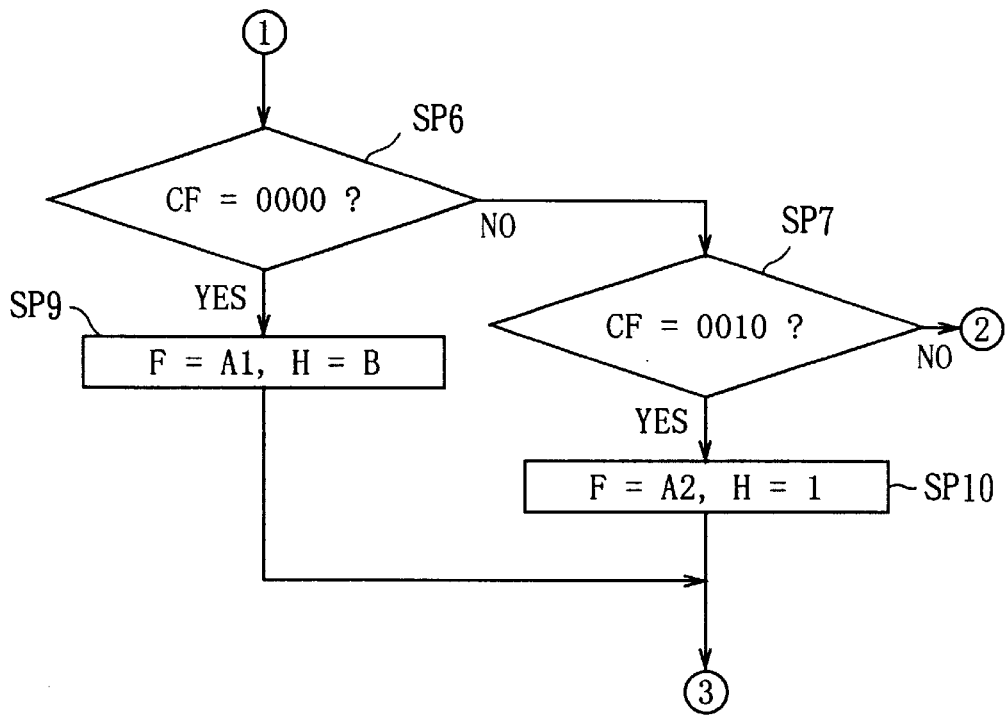
FIG. 5 is a flowchart showing a procedure for a compression coding and decoding process using CF information.

In other words, in Power-ON state, in the procedure as shown in FIGS. 4 and 5, the procedure starts at step SP1. Next, the correspondence information is set at the subsequent step SP2. The correspondence information determines the relation between the bit pattern shown in the CF information and the corresponding GOP sequence process. For example, in the case where the CF information is shown in four bits in each image frame in a GOP which constitutes one unit with two frames, the coding method is made to correspond to the respective bit patterns of four fields of the CF information, namely "0000" through "0011".

The set content is memorized respectively in the recording system control part 5 and in the playing back system control part 12 (FIG. 2). Incidentally, the GOP sequence in each GOP is patterned so that the same processing is carried out for each GOP. In other words, in the case where the frame A1 is coded in the B-picture in the first GOP, frame A1 in subsequent GOP's is always coded into the B-picture.

At the subsequent step SP3, the image frame is read to the MPEG encoder 3 or to the MPEG decoder 10. At step SP4, the CF information signal S3 is extracted from the read image frame. The extracted CF information signal S3 is supplied to the recording system control part 5 or the playing back system control part 12.

Subsequently, at step SP5, the bit pattern of the CF information signal S3 extracted in this manner is compared with the set correspondence information (FIG. 3).

In the beginning, at step SP6, it is judged whether or not the bit pattern comprising four bits represented by the CF information signal S3 is "0000". When the bit pattern is "0000", it is judged that the frame position is the first frame A1 before the coding of the image frame when the CF information S3 is extracted, and at the same time, it is judged that the image frame will be coded in the B-picture. Otherwise the process proceeds to the next judging step SP7.

At step SP7, it is judged whether or not the bit pattern comprising four bits represented by the CF information signal S3 is "0010". When the bit pattern is "0010", it is judged that the frame position of the image frame in the GOP is the second frame A2 before the coding of the image frame when the CF information signal S3 is extracted. At the same time, it is judged that the image frame will be coded in the I-picture.

In this manner, a GOP sequence process depending on the judgment result will be selected. The selected GOP sequence process is performed with an instruction given from the recording system control part 5 to the MPEG encoder 3. Such processing is repeated for each image frame.

In this manner, the process in each GOP is patterned, and at the same time, a compressed coding in which the GOP sequence is stored can be realized also in dubbing.

In the aforementioned structure, a CF information signal S3 comprising a video pattern which continuously changes and at the same time which is repeated in a definite cycle is extracted from a video index signal, which is added to the component SDI signal S2, is extracted for each image frame so that the compressed coding for the GOP sequence is performed without referring to the GOP sequence information by referring to correspondence information which is preliminarily set by allowing the bit pattern represented by the CF information to correspond to the GOP sequence on a one to one basis.

In this manner, a coding method and a recording and reproducing apparatus 1 can be realized which are capable of coding a moving image signal with storing the GOP sequence without using the GDP sequence information.

Incidentally, in the aforementioned embodiment, when the bit pattern comprising four bits represented in the CF information signal S3 is "0000" or "0001", it is judged that the frame position of the image frame in the GOP was the first frame A1 before the coding of the image frames into which the CF information signal S3 is extracted. At the same time, there is described a case in which the image frame will be coded or is coded into the B-picture. The present invention is not limited thereto. The bit patterns and the GOP sequence processes that correspond to them can be combined in any manner.

For example, in the case where the bit pattern made up of 4 bits indicated in the CF information signal S3 is "0000" or "0001", it may be judged that the frame position in the GOP was the second frame A2 before the coding of the image frames into which the CF information signal S3 is extracted. At the same time, it may be judged that the image frame will be coded or is coded into the I-picture.

Furthermore, in the aforementioned embodiments, there is described a coding method, and a recording and reproducing apparatus 1 which are capable of coding a moving image comprising a composite signal in the NTSC format on the basis of the CF information instead of a GOP sequence. However, the present invention is not limited thereto. A coding method and a recording and reproducing apparatus may also be used which execute GOP sequence processing on a moving image signal comprising a composite signal in the PAL format.

However, in this case, it is necessary to exchange the NTSC decoder 2 and the NTSC encoder 14 provided on the recording and playing back apparatus 1 with ones for PAL.

Furthermore, in the aforementioned embodiments, there is described a case in which the recording and playing back apparatus 1 uses a recording apparatus comprising an MO disk drive 8. However, the present invention is not limited thereto. A recording apparatus which uses another recording medium may be used.

Furthermore, in the aforementioned embodiments, there is described a recording apparatus wherein one GOP unit comprises two frame image frames. However, the present invention is not limited thereto. In the case where a frame comprises the same number or a half number of the number of frames included in one color frame period, the present system can be applied. In concrete, in the NTSC format, GOP length applying this format is only two frame because color frame is concluded for four fields, on the contrary, in the PAL format, this system can be applied when GOP length is two frame or four frame because color frame is concluded for eight fields.

As described above, in accordance with the present invention, a GOP sequence which corresponds to the color frame sequence information extracted from the moving image and to the compressed moving image data is selected by using set information by arranging the image frames in the same frame order in each of the plurality of GOP's and by setting each of the GOP's so that each of the GOP's is processed in the same GOP sequence to set the color frame sequence information to correspond to the GOP sequence on a one to one basis, with the result that the coding process and the decoding process can be realized by means of the selected GOP sequence.

In this manner, a coding method and a recording and reproducing apparatus can be realized which stores a GOP sequence to suppress the deterioration of image-quality on dubbing, and can perform compressive coding comprising the GOP sequence same as when compressing at the last time.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A recording and reproducing apparatus for compressing and coding an input video signal to record on a predetermined recording medium, and for reproducing said compressed and coded video signal from said recording medium to decode it, comprising:

extracting means for extracting color frame information from video frames of said input video signal and the compressed video signal outputted from said recording medium;

control means for storing correspondence information which shows the correspondence relation between compression information, which is needed when said video signal is compressed and coded, and said color frame information, to control the coding of the video image based on the correspondence information according to said compression information which is corresponding to said extracted color frame information; and adding means for adding the color frame information extracted by said extracting means to the compressed and coded video signal and the decoded video signal.

2. The recording and reproducing apparatus of claim 1 wherein said compression information is GOP sequence information which shows the compression format when said input video signal is compressed and coded in each unit of GOP.

3. The recording and reproducing apparatus of claim 1 wherein said color frame information is corresponding to said GOP sequence when the number of image frames in one GOP unit is the number of frames included in one color frame period or half number of that.

4. A recording and reproducing apparatus for recording an input video signal onto a predetermined recording medium and for reproducing the video signal from the recording medium, comprising:

extracting means for extracting color frame information from said input video signal;

coding means for performing compression coding to said video signal by using a frame correlation;

coding control means for storing correspondence information which shows the correspondence relation between the color frame information extracted by said extracting means and compression information, which is needed in compression coding by said coding means, to control the coding of said coding means based on said correspondence information according to said compression information which is corresponding to said color frame information outputted from said extracting means;

adding means for adding the color frame information extracted by said extracting means to said video signal compressed and coded by said coding means;

recording means for recording said video signal supplied from said adding means onto said predetermined recording medium; and reproducing means for extracting said color frame information from said video signal recorded on said recording medium and decoding said video signal, and for adding said color frame information to said decoded video signal to output it.

5. The recording and reproducing apparatus according to claim 4, wherein said compression coding and decoding are performed in the MPEG format, and said compression information is the GOP sequence information which shows the correspondence between an I-picture and a B-picture of said input video signal and the compressed and coded video signal.

6. The recording and reproducing apparatus according to claim 4, wherein said color frame information corresponds to said compression information when the number of image frames in one GOP unit is the number of frames included in one color frame period or half number of that.

7. The recording and reproducing apparatus according to claim 4, wherein said coding control means selects the stored compression information which is shown in said correspondence information on the basis of said color frame information outputted from said extracting means and supplies a control signal showing the selected compression information to said coding means, and said coding means performs sequence-processing to the input video signal on the basis of the compression information instructed by the control signal.

8. The recording and reproducing apparatus according to claim 4, wherein said coding control means makes said color frame information extracted by said extracting means into a phase to compensate the time necessary for compression coding of said input video signal by said coding means and outputs it to said adding means.

9. The recording and reproducing apparatus according to claim 4, wherein said input video signal is a component digital video signal.

* * * * *